(12) United States Patent
Tamura

(10) Patent No.: US 12,345,316 B2
(45) Date of Patent: Jul. 1, 2025

(54) SPEED REDUCER

(71) Applicant: SUMITOMO HEAVY INDUSTRIES, LTD., Tokyo (JP)

(72) Inventor: Mitsuhiro Tamura, Yokosuka (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 18/494,982

(22) Filed: Oct. 26, 2023

(65) Prior Publication Data

US 2024/0141977 A1    May 2, 2024

(30) Foreign Application Priority Data

Nov. 1, 2022    (JP) .................. 2022-175730

(51) Int. Cl.
*F16H 55/06*    (2006.01)
*F16H 49/00*    (2006.01)
*F16H 1/32*    (2006.01)

(52) U.S. Cl.
CPC ........... *F16H 55/06* (2013.01); *F16H 49/001* (2013.01); *F16H 2001/323* (2013.01); *F16H 2001/327* (2013.01)

(58) Field of Classification Search
CPC .. F16H 55/06; F16H 49/001; F16H 2001/323; F16H 2001/327
See application file for complete search history.

(56) References Cited

U.S. PATENT DOCUMENTS 11,845,205 B2 *  12/2023  Tamura ............... B29C 45/0005
2021/0354348 A1   11/2021  Tamura et al.

FOREIGN PATENT DOCUMENTS

| CN | 109163067 A | * | 1/2019 | .......... F16H 49/001 |
| DE | 102021110900 A1 | | 11/2021 | |
| DE | 102021130960 A1 | | 6/2022 | |
| JP | 2021-181126 A | | 11/2021 | |

* cited by examiner

*Primary Examiner* — Thomas C Diaz
(74) *Attorney, Agent, or Firm* — HEA Law PLLC

(57) ABSTRACT

A speed reducer includes an output member to which a driven member is connected, in which the output member is formed of resin and includes a plurality of first screw holes into which fine-thread screws for connection of the driven member are screwed and each of which includes a bottom, and the output member is provided with a weight reduction portion between the plurality of first screw holes in a circumferential direction.

12 Claims, 3 Drawing Sheets

A-A

B-B

SPEED REDUCER

CROSS-REFERENCE TO RELATED APPLICATIONS

This application claims priority to Japanese Patent Application No. 2022-175730, filed on Nov. 1, 2022, which is incorporated by reference herein in its entirety.

BACKGROUND

Technical Field

A certain embodiment of the present invention relates to a speed reducer.

Description of Related Art

In the related art, there have been attempts to apply a resin material to a speed reducer component for the purpose of weight saving. For example, a second internal gear, which is a member installed into a gear device and is formed of a resin material, is described in the related art. The second internal gear is provided with a connection hole for connection to an external member which is a drive target and a connection hole for connection to a second cover. A female screw portion to which a bolt for connection is to be fastened is formed in each of the connection holes.

SUMMARY

A speed reducer according to an embodiment of the present invention is a speed reducer including an output member to which a driven member is connected, in which the output member is formed of resin and includes a plurality of first screw holes into which fine-thread screws for connection of the driven member are screwed and each of which includes a bottom, and the output member is provided with a weight reduction portion between the plurality of first screw holes in a circumferential direction.

Note that, any combinations of the above components, and those obtained by substituting the components or expressions in an embodiment of the present invention with each other between methods, systems, or the like are also effective as an aspect of the present invention.

DETAILED DESCRIPTION

Figure 1:
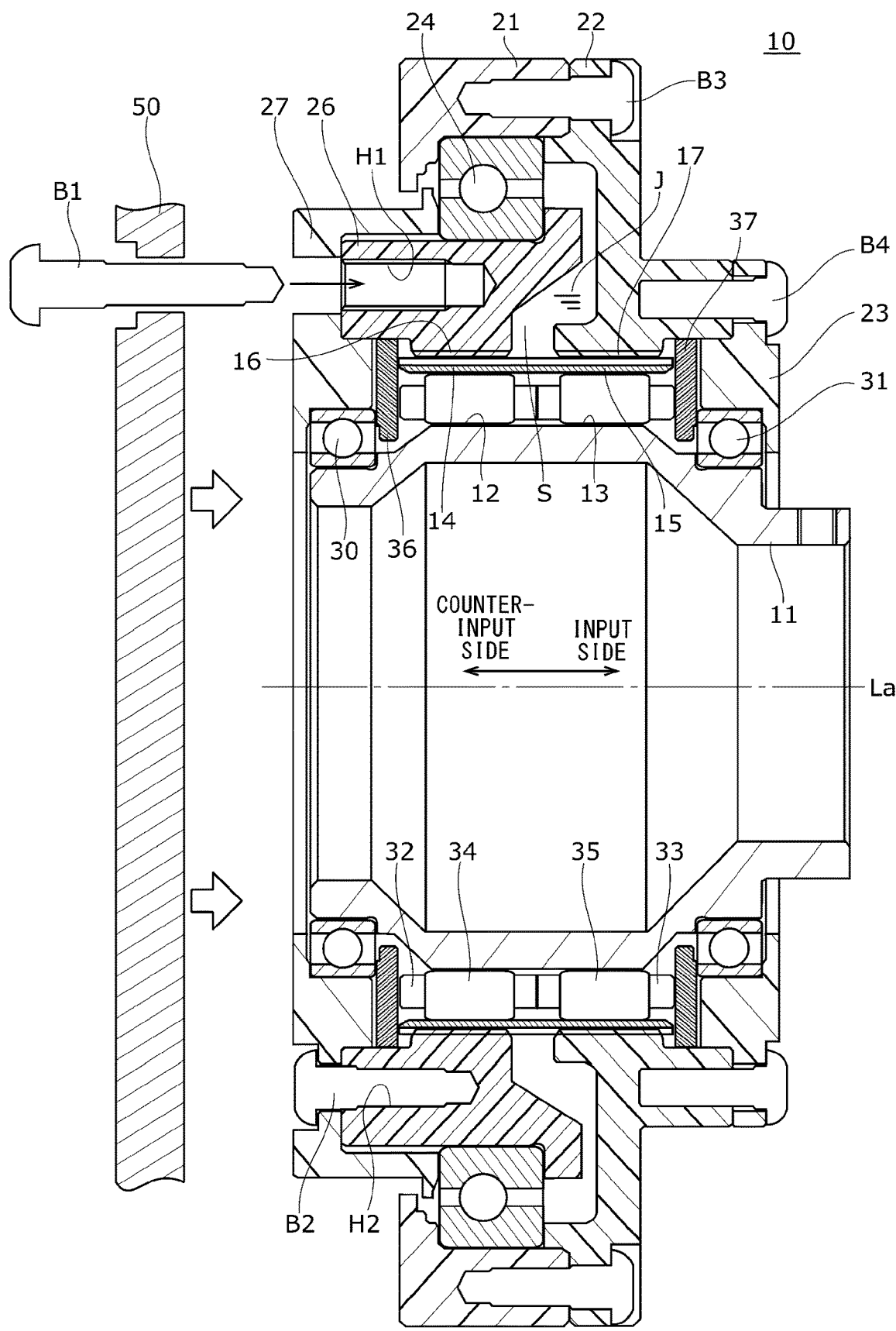
FIG. 1 is a side view schematically showing a speed reducer according to an embodiment.

Since a resin material has self-lubricating property and causes a peculiar phenomenon such as creep, it is important to sufficiently take care about a fastening structure. Particularly, in the case of screw fastening in which a female screw made of resin is used, an excessive tightening torque may cause shear failure or creep failure of the female screw. It is conceivable to insert-mold a female screw made of metal for the purpose of reduction of the influence of creep or the like. However, such a case results in a disadvantage in terms of manufacturing cost and a decrease in precision may also be caused. It cannot be said that sufficient disclosure has been made in the related art from the viewpoint of reducing the influence of creep or the like with respect to a resin member.

It is desirable to provide a speed reducer with which it is possible to reduce the influence of creep of a resin member.

Hereinafter, the present invention will be described with reference to the drawings based on a preferred embodiment. In the embodiment and modification examples, the same or equivalent components and members will be represented by the same reference numerals and repetitive description will be appropriately omitted. In addition, the dimensions of members in each drawing have been appropriately enlarged and reduced for easy understanding. Moreover, in each drawing, some of the members not important for description of the embodiment are not shown.

Further, different components that have something in common are distinguished from each other by adding ordinal numbers such as "first, second" to the beginnings of the names of the components, and these terms will be omitted when the components are collectively referred to. In addition, although terms including ordinal numbers such as "first" and "second" will be used to describe various components, the terms will be used only for the purpose of distinguishing one component from the other component and no component is limited by the terms.

Embodiment

Hereinafter, the overall configuration of a speed reducer according to an embodiment of the present invention will be described with reference to FIG. 1. FIG. 1 is a side view schematically showing the speed reducer according to the embodiment. For example, a speed reducer 10 is a bending meshing type gear device. The speed reducer 10 of the embodiment includes an input shaft 11, wave generators 12 and 13, external gears 14 and 15, a main bearing 24, input shaft bearings 30 and 31, wave generator bearings 34 and 35, internal gears 16 and 17, casings 21, 22, and 23, output members 26 and 27, and backing plate members 36 and 37.

Hereinafter, a direction along a center axis La of the internal gears 16 and 17 will be referred to as an "axial direction" and a circumferential direction and a radial direction of a circle around the center axis La will be referred to as a "circumferential direction" and a "radial direction", respectively. In addition, hereinafter, for the sake of convenience, one side (the right side in the drawing on which a drive source is disposed) in the axial direction will be referred to as an input side and the other side (the left side in the drawing on which a driven member is disposed) will be referred to as a counter-input side. Writing the directions in such a manner is not for limiting the posture in which the speed reducer 10 is used and the speed reducer 10 can be used in any posture.

A first wave generator 12, which is one of the wave generators 12 and 13, is disposed closer to the counter-input side than a second wave generator 13 is. A first external gear 14, which is one of the external gears 14 and 15, is disposed closer to the counter-input side than a second external gear 15 is. A first internal gear 16, which is one of the internal gears 16 and 17, is disposed closer to the counter-input side than a second internal gear 17 is. A first input shaft bearing 30, which is one of the input shaft bearings 30 and 31, is disposed closer to the counter-input side than a second input shaft bearing 31 is. A first wave generator bearing 34, which is one of the wave generator bearings 34 and 35, is disposed closer to the counter-input side than a second wave generator bearing 35 is. A first backing plate member 36, which is one of the backing plate members 36 and 37, is disposed closer to the counter-input side than a second backing plate member 37 is.

The speed reducer 10 is a bending meshing type gear device in which the external gears 14 and 15 meshing with the internal gears 16 and 17 are caused to be bent and deformed so that the external gears 14 and 15 are rotated and an axial rotation component thereof is output.

The input shaft 11 is a hollow shaft member, a motor of a drive unit is connected to an input side of the input shaft 11, and power rotation from the motor is input to the input side. The input shaft 11 includes the wave generators 12 and 13 and also functions as a wave generator shaft. The wave generators 12 and 13 are integrally formed on an outer periphery of the input shaft 11. The shape of an outer periphery of each of the wave generators 12 and 13 is an oval shape in a cross section perpendicular to a direction along the center axis La. The term "oval shape" herein is not limited to a geometrically exact oval shape but also means an approximately oval shape.

The external gears 14 and 15 are tubular members having a flexibility. The external gears 14 and 15 are provided to be separated from each other in the axial direction on an outer peripheral portion of a tubular portion functioning as an external gear base portion. Note that the first external gear 14 and the second external gear 15 are integrally formed with each other to be continuous in the axial direction on an outer periphery of a tubular base portion, and the first external gear 14 and the second external gear 15 have the same number of teeth. The first external gear 14 meshes with the first internal gear 16 functioning as an output internal gear and the second external gear 15 meshes with the second internal gear 17 functioning as a decelerating internal gear.

As the wave generators 12 and 13 are rotated, the external gears 14 and 15 are bent and deformed into oval shapes by the wave generators 12 and 13 via the wave generator bearings 34 and 35. At this time, the external gears 14 and 15 are bent and deformed into oval shapes matching the shapes of the wave generators 12 and 13 while positions where the external gears 14 and 15 and the internal gears 16 and 17 mesh with each other are changed in the circumferential direction. The wave generator bearings 34 and 35 are disposed between the wave generators 12 and 13 and the external gears 14 and 15. In the embodiment, the wave generator bearings 34 and 35 include retainers 32 and 33.

The number of teeth of the first internal gear 16 is the same as the number of teeth of the first external gear 14, and the number of teeth of the second internal gear 17 is 2i (i is a natural number equal to or greater than 1) more than the number of teeth of the second external gear 15. Accordingly, when the wave generators 12 and 13 are rotated, rotation of which the magnitude is the same as the axial rotation component of the external gears 14 and 15 is output to the first internal gear 16.

The casings 21, 22, and 23 include a first casing 21 that rotatably supports the first internal gear 16 via the main bearing 24, a second casing 22 that is disposed closer to the input side than the first casing 21 is, and a third casing 23 that is disposed closer to the input side than the second casing 22 is. The second internal gear 17 is integrated with the second casing 22. The first casing 21 and the second casing 22 are connected to each other by bolts B3. The second casing 22 and the third casing 23 are connected to each other by bolts B4.

The output members 26 and 27 extract the axial rotation component of the external gear 14 and transmit the axial rotation component to a driven member 50. The output members 26 and 27 include a first output member 26 and a second output member 27 that is disposed closer to the counter-input side than the first external gear 14 is. The first output member 26 is integrated with the first internal gear 16. The first output member 26 and the second output member 27 are connected to each other by a connection bolt B2.

The first input shaft bearing 30 is disposed between the second output member 27 and the input shaft 11. The second input shaft bearing 31 is disposed between the third casing 23 and the input shaft 11. The input shaft bearings 30 and 31 rotatably support, with respect to the second output member 27 and the third casing 23, the input shaft 11 that includes the wave generators 12 and 13. Although the configurations of the input shaft bearings 30 and 31 are not limited, the input shaft bearings 30 and 31 in this example are ball bearings.

The main bearing 24 is disposed between the first casing 21 and the first output member 26. The main bearing 24 rotatably supports the output members 26 and 27 with respect to the first casing 21. Although the configuration of the main bearing 24 is not limited, the main bearing 24 in this example is a ball bearing.

The first backing plate member 36 is disposed closer to the counter-input side than the first external gear 14 is. The second backing plate member 37 is disposed closer to the input side than the second external gear 15 is. The backing plate members 36 and 37 are annular plate members that surround the input shaft 11. The backing plate members 36 and 37 extend on the counter-input side and the input side with respect to the external gears 14 and 15 and the wave generator bearings 34 and 35 so as to restrict the external gears 14 and 15 and the retainers 32 and 33 from moving toward the counter-input side and the input side in the axial direction.

The operation of the speed reducer 10 will be described. When the input shaft 11 rotates due to rotation of the motor (not shown), the wave generators 12 and 13 rotate together with the input shaft 11. In a case where the wave generators 12 and 13 are rotated, the external gears 14 and 15 are continuously bent and deformed into oval shapes matching the shapes of the wave generators 12 and 13 while positions where the external gears 14 and 15 and the internal gears 16 and 17 mesh with each other are changed in the circumferential direction. Each time the wave generators 12 and 13 make one rotation, the external gears 14 and 15 rotate relative to the second internal gear 17 by an amount corresponding to a difference in number of teeth between the second internal gear 17 and the second external gear 15.

At this time, the external gears 14 and 15 rotate with the speed of rotation of the wave generators 12 and 13 being reduced at a reduction ratio corresponding to the difference in number of teeth. The first internal gear 16 has the same number of teeth as the first external gear 14. Therefore, the first internal gear 16 rotates in synchronization with the same axial rotation component as the external gears 14 and 15 with a relative position where the first internal gear 16 meshes with the external gears 14 and 15 being not changed after the wave generators 12 and 13 make one rotation. The first output member 26 is formed integrally with the first internal gear 16, and the rotation of the first internal gear 16 is transmitted to the driven member 50 via the first output member 26 and the second output member 27. As a result, rotation input to the input shaft 11 is transmitted as rotation of the driven member 50 after the speed thereof is reduced.

The material of each of members constituting the speed reducer 10 will be described. A material of each member other than the gear is not particularly limited. In the embodiment, the materials are configured as follows. The casings 21, 22, and 23, the output members 26 and 27, and the backing plate members 36 and 37 are formed of resin materials. As the resin material, a resin alone or a resin containing a reinforcing fiber is applicable. For example, various resin materials such as a poly ether ether ketone (PEEK) material and a polyacetal or polyoxymethylene (POM) material can be adopted. As the resin containing the reinforcing fiber, a composite material such as carbon fiber reinforced plastic (CFRP), a composite material of the resin and another material, a baking material (paper baking material or cloth baking material) can be applied. Since the members are formed of the resin, it is possible to aim low cost and weight saving of the speed reducer 10.

The input shaft 11, the wave generators 12 and 13, and the external gears 14 and 15 are formed of a steel material (metal material) such as nickel chrome molybdenum steel. On the other hand, the internal gears 16 and 17 are formed of a carbon fiber reinforced resin material in which a carbon fiber is contained as a reinforcing fiber in a base resin. As the base resin, for example, various resin materials such as a PEEK material and a POM material can be adopted. When the reinforcing fiber contained in the resin material is a fiber which is not tied in a cloth shape, injection molding or compression molding can be performed by using the resin material. When the materials contained in the resin material are fibers that are tied in a cloth shape or a piece shape, compression molding using the resin material can be performed.

In order to ensure the lubricity of a movable portion, an internal space S of the speed reducer 10 is filled with a lubricant J.

Figure 2:
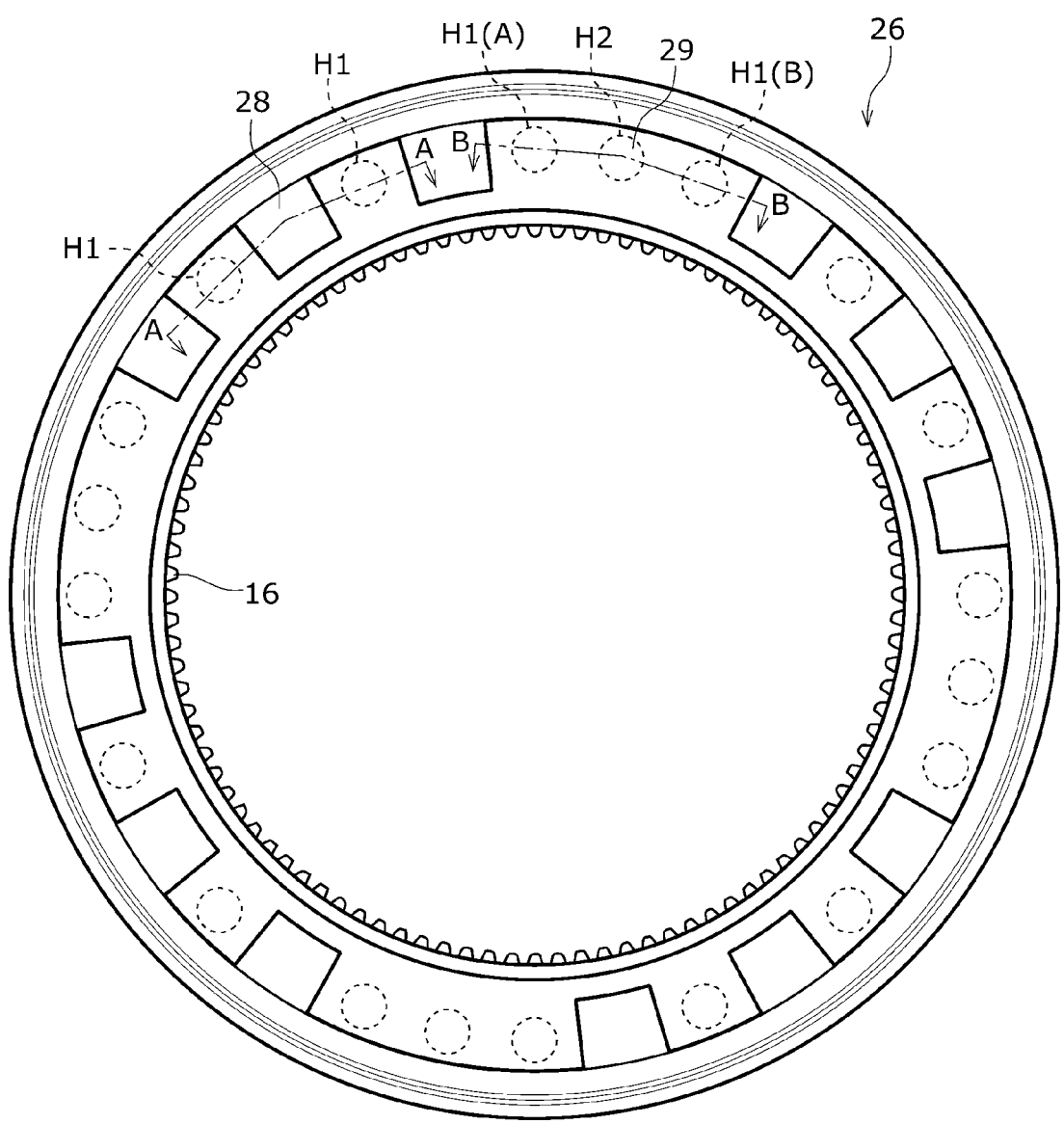
FIG. 2 is a view of an output member of the speed reducer in FIG. 1 as seen from an input side.
Figure 3A:
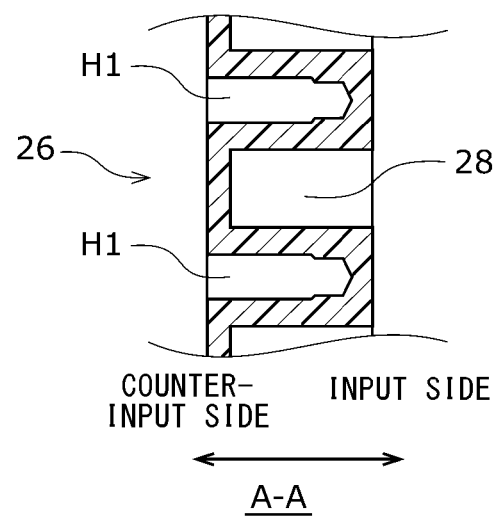
FIG. 3A shows a cross section of the output member which is taken along line A-A in FIG. 2.
Figure 3B:
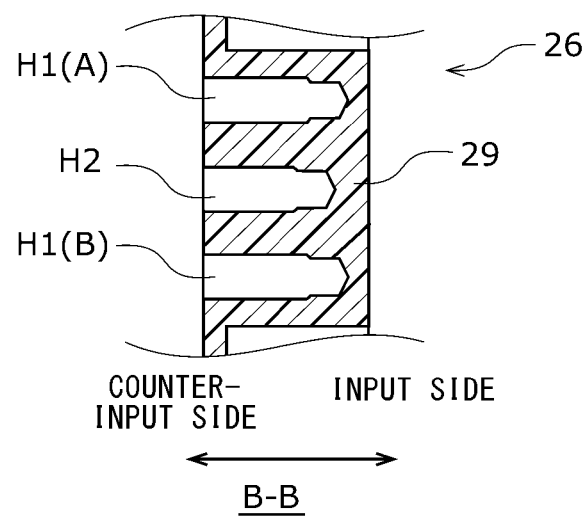
FIG. 3B shows cross a section of the output member which is taken along line B-B in FIG. 2.

A characteristic configuration of the speed reducer 10 according to the embodiment will be described with reference to FIGS. 2, 3A, and 3B as well. FIG. 2 is a view of the first output member 26 as seen from the input side. FIG. 3A shows a cross section of the first output member 26 which is taken along line A-A and FIG. 3B shows a cross section of the first output member 26 which is taken along line B-B.

It is conceivable to apply a resin material to a member of a speed reducer. The resin member causes a creep phenomenon in which a peripheral portion is deformed with time when a constant load is applied. In addition, since the resin material has self-lubricating property, a fastening structure may be loosened in combination with a creep phenomenon. Particularly, in the case of a screw fastening portion that includes a female screw made of resin, an excessive tightening torque may cause shear failure or creep failure of the female screw. It is conceivable to insert-mold a female screw made of metal for the purpose of reduction of the influence of creep or the like. However, such a case results in a disadvantage in terms of manufacturing cost and a decrease in precision may also be caused.

For suppression of a phenomenon in which a screw fastening portion is loosened with time, the speed reducer 10 is a speed reducer including the output members 26 and 27 to which the driven member 50 is connected, the output members 26 and 27 are formed of resin and include a plurality of first screw holes H1 into which fine-thread screws B1 for connection of the driven member 50 is screwed and each of which has a bottom, and the output members 26 and 27 are provided with weight reduction portions 28 between the plurality of first screw holes H1 in the circumferential direction. As shown in FIG. 3A, the first screw holes H1 and the weight reduction portions 28 are provided to alternate in the circumferential direction from opposite directions in the axial direction. The first screw holes H1 in this example are circular holes recessed toward the input side from openings on the counter-input side. Taps (female screws) may be provided in the first screw holes H1. In the example of FIGS. 3A and 3B, the width of the weight reduction portions 28 in the circumferential direction is larger than the width of the first screw holes H1 in the circumferential direction.

According to this configuration, since the lead angle of the fine-thread screw B1 is small, the fine-thread screw B1 is less likely to be loosened and a torque at the time of loosening the fine-thread screw B1 is small. Therefore, a phenomenon in which a screw fastening portion is loosened with time can be suppressed. In addition, since the fine-thread screw B1 has a large effective diameter in comparison with a coarse-thread screw having the same size, the fine-thread screw B1 has a high load bearing capacity and since the fine-thread screw B1 has a large effective cross-sectional area, the fine-thread screw B1 is highly resistant against an external force in a shearing direction. Furthermore, in the case of the fine-thread screw B1, it is possible to obtain a required axial force with a small torque in comparison with the case of a coarse-thread screw. Accordingly, damage to the first screw holes H1 can be reduced. Since each of the first screw holes H1 has a bottom, the lubricant J is less likely to leak from the first screw holes H1.

In the example of FIG. 2, the plurality of (for example, 16) first screw holes H1 are provided at predetermined intervals in the circumferential direction. The plurality of first screw holes H1 may be disposed at equal intervals in the circumferential direction. Each of a plurality of (for example, 12) the weight reduction portions 28 is provided between two first screw holes H1 that are adjacent to each other in the circumferential direction. Each weight reduction portion 28 has a fan-shaped or rectangular contour as seen from the input side. The weight reduction portion 28 is a recessed portion recessed toward the counter-input side from an opening on the input side and is provided as a non-penetrating bottomed hole. Since the weight reduction portions 28 are provided, an effect of uniformizing the cooling speed of the first output member 26 at the time of resin molding and ensuring shape precision can be expected. Since each of the weight reduction portions 28 has a bottom, the lubricant J is less likely to leak from the weight reduction portions 28.

It is also possible to integrally form the output members 26 and 27 by resin molding. However, in this case, a mold structure becomes complicated, and there may be an increase in number of processes at the time of resin molding. Therefore, in the speed reducer 10 of the embodiment, the output members 26 and 27 are configured such that the first output member 26 and the second output member 27 are connected to each other and the output members 26 and 27 include second screw holes H2 into which connection bolts B2 for connection between the first output member 26 and the second output member 27 are screwed. In this case, manufacturing the output members 26 and 27 is easy. The second output member 27 also functions as a cover that covers a counter-input side of the input shaft bearing 30.

For example, each of the second screw holes H2 is disposed between, in the circumferential direction, one screw hole H1 (A) and another screw hole H1 (B) from among the plurality of first screw holes H1. The one screw hole H1 (A) and the other screw hole H1 (B) are two of the plurality of first screw holes H1 that are adjacent to each other in the circumferential direction. In the example of FIG. 2, a plurality of (for example, four) the second screw holes H2 are provided at predetermined intervals in the circumferential direction. Each of the second screw holes H2 is disposed at the center of a space between the one screw hole H1 (A) and the other screw hole H1 (B) in the circumferential direction. The positions of the second screw holes H2 in the radial direction are the same as the positions of the first screw holes H1 in the radial direction. The second screw holes H2 in this example are circular holes recessed toward the input side from openings on the counter-input side. Taps (female screws) may be provided in the second screw holes H2.

From the viewpoint of suppressing a phenomenon of being loosened with time, it is desirable to reinforce the periphery of the first screw holes H1 for stiffness maintenance. Therefore, in the embodiment, as shown in FIG. 2, the first output member 26 does not include the weight reduction portion 28 between the one screw hole H1 (A) and the other screw hole H1 (B) in the circumferential direction. In other words, in the circumferential direction, a covering portion 29 is provided at a position corresponding to a weight reduction portion between the one screw hole H1 (A) and the other screw hole H1 (B) that are adjacent to each other with the second screw hole H2 interposed therebetween. As shown in FIG. 3B, the second screw hole H2 is formed from the counter-input side at the covering portion 29. Therefore, a thick portion is barely formed and the cooling speed of the first output member 26 at the time of resin molding is made uniform.

Since the connection bolts B2 support the second output member 27 and bear a smaller load than the first screw holes H1, it is desirable that the connection bolts B2 are inexpensive. Therefore, in the embodiment, the connection bolts B2 are coarse-thread screws and each of the second screw holes H2 includes a bottom. Such a case is more advantageous in terms of cost in comparison with the case of a fine-thread screw. In addition, since each of the second screw holes H2 has a bottom, the lubricant J is less likely to leak from the second screw holes H2.

Since a large load is applied between the first output member 26 and the first internal gear 16 during torque transmission, it is desirable that both of the first output member 26 and the first internal gear 16 have a large coupling strength. Therefore, as described above, the first output member 26 is formed integrally with the first internal gear 16, and the first output member 26 is the internal gear 16. In this case, a larger coupling strength can be realized in comparison with a case where the first output member 26 and the first internal gear 16 are separately formed from each other and then coupled to each other.

In the embodiment, the second output member 27 functions as a bearing housing in which the bearing 30 supporting the input shaft 11 is disposed. In this case, the number of components is reduced in comparison with a case where a dedicated member is provided to support the input shaft 11, which is advantageous in terms of size reduction, cost, and reliability.

As described above, the wave generators 12 and 13, the external gears 14 and 15 bent and deformed by the wave generators 12 and 13, and the first internal gear 16 and the second internal gear 17 meshing with the external gears 14 and 15 are provided. In the embodiment, the first output member 26 is the first internal gear 16, and the second output member 27 functions as a bearing housing in which the bearing 30 supporting the wave generators 12 and 13 is disposed. In this case, the number of components is reduced in comparison with a case where a dedicated member is provided to support the wave generators 12 and 13, which is advantageous in terms of size reduction, cost, and reliability.

Hereinabove, an example of the embodiment of the present invention has been described in detail. The embodiment described above is merely a specific example for implementing the present invention. The contents of the embodiment are not intended to limit the technical scope of the present invention and various design changes such as modification, addition, and deletion of components can be made without departing from the scope of the invention defined in claims. In the above-described embodiment, description has been made with use of expressions such as "according to the embodiment" and "in the embodiment" in relation to the contents of which such a design change can be made. However, it cannot be said that a design change of the contents described with no such expressions is not allowed. In addition, hatching in the cross sections of the views is not intended to limit the material of a hatched object.

Hereinafter, modification examples will be described. In the drawings and description of the modification examples, the same or equivalent components and members as the embodiment will be represented by the same reference numerals. Description overlapping with that in the embodiment will be appropriately omitted and description will be made focusing on configurations different from that in the embodiment.

In the description of the embodiment, an example where the speed reducer 10 is a tubular bending meshing type gear device has been described. However, the present invention is not limited thereto. The speed reducer may be another type of gear device. Examples of such another type of gear device include a bending meshing type gear device of a cup type, a silk hat type, or the like, an eccentric oscillation type gear device of a center crank type, a distribution type, or the like, and a simple planetary type gear device.

In the description of the embodiment, an example in which the weight reduction portion 28 has a shape recessed toward the counter-input side from an opening on the input side has been described. However, the present invention is not limited thereto. For example, the weight reduction portion may have a shape recessed toward the input side from an opening on the counter-input side.

In the description of the embodiment, an example in which the weight reduction portion 28 is provided with no rib has been described. However, the present invention is not limited thereto. For example, the weight reduction portion may be provided with a rib.

In the description of the embodiment, an example in which the width of the weight reduction portion 28 in the circumferential direction is larger than the width of the first screw hole H1 in the circumferential direction has been described. However, the present invention is not limited thereto. The width of the weight reduction portion in the circumferential direction may be equal to or smaller than the width of the first screw hole in the circumferential direction.

In the description of the embodiment, an example in which the weight reduction portion 28 has a fan-shaped or rectangular contour as seen in the axial direction has been described. However, the present invention is not limited thereto. For example, the weight reduction portion may have a circular contour, an oval contour, a polygonal contour, or the like as seen in the axial direction.

Each of the modification examples described above has the same operations and effects as the embodiment.

Any combination of the components in the above-described embodiment and the modification examples is also useful as an embodiment of the present invention. The new embodiment generated by the combination has the effects of the embodiment and the modification examples combined with each other.

It should be understood that the invention is not limited to the above-described embodiment, but may be modified into various forms on the basis of the spirit of the invention. Additionally, the modifications are included in the scope of the invention.

What is claimed is:

1. A speed reducer comprising:
an output member to which a driven member is connected,
wherein the output member is formed of resin and includes a plurality of first screw holes,
wherein the plurality of first screw holes are configured to connect the output member to the driven member via fine-thread screws,
wherein the plurality of fire crew holes each Includes a bottom, and
the output member is provided with a weight reduction portion between the plurality of first screw holes in a circumferential direction,
wherein the weight reduction portion overlaps with a first screw hole the plurality of first screw holes in a circumferential direction.

2. The speed reducer according to claim 1, wherein the first screw hole is a substantially circular hole recessed toward an input side from an opening on a counter-input side.

3. The speed reducer according to claim 2, wherein a width of the weight reduction portion in the circumferential direction is larger than a width of the first screw hole in the circumferential direction.

4. The speed reducer according to claim 1, wherein the plurality of first screw holes are disposed at equal intervals in the circumferential direction.

5. The speed reducer according to claim 1, wherein the weight reduction portion is a recessed portion recessed toward a counter-input side from an opening on an input side and is provided as a non-penetrating bottomed hole.

6. The speed reducer according to claim 5, wherein the weight reduction portion has a substantially fan-shaped or substantially rectangular contour as seen from the input side.

7. The speed reducer according to claim 1,
wherein the output member comprises:
a first member;
a second output member;
a second screw hole; and
a connection bolt
wherein the first output member and the second output member are connected to each other by the second screw hole and the connection bolt;
wherein the second screw hole is configured to receive the connection bolt which connects the first output member and the second output member, by screwing,
the second screw hole is disposed between, in the circumferential direction, one screw hole and another screw hole from among the plurality of first screw holes, and
the output member does not include the weight reduction portion between the one screw hole and the other screw hole in the circumferential direction.

8. The speed reducer according to claim 7, wherein the connection bolt is a coarse-thread screw and the second screw hole includes a bottom.

9. The speed reducer according to claim 8, wherein a position of the second screw hole in a radial direction is the same as a position of the first screw hole in the radial direction.

10. The speed reducer according to claim 9, wherein the second screw hole is a substantially circular hole recessed toward an input side from an opening on a counter-input side.

11. The speed reducer according to claim 7, wherein the first output member is an internal gear and the second output member is a bearing housing comprising a bearing and an input shaft, said bearing supporting the input shaft.

12. The speed reducer according to claim 11, further comprising:
a wave generator;
an external gear bent and deformed by the wave generator; and
a first internal gear and a second internal gear meshing with the external gear,
wherein the first output member is the first internal gear and the second output member is the bearing housing.

* * * * *